(12) United States Patent  (10) Patent No.: US 6,979,030 B2
Hudson  (45) Date of Patent: Dec. 27, 2005

(54) GOLF CAR BUMPER

(75) Inventor: James Hudson, McMurray, PA (US)

(73) Assignee: Hud-Marsh Golf Products, Pittsburgh, PA (US)

( * ) Notice: Subject to any disclaimer, the term of this patent is extended or adjusted under 35 U.S.C. 154(b) by 0 days.

(21) Appl. No.: 10/702,214

(22) Filed: Nov. 5, 2003

(65) Prior Publication Data

US 2004/0145194 A1    Jul. 29, 2004

Related U.S. Application Data

(60) Provisional application No. 60/423,842, filed on Nov. 5, 2002.

(51) Int. Cl.$^7$ .............................................. B60R 19/00
(52) U.S. Cl. ....................... 293/102; 293/142; 293/155
(58) Field of Search ............................. 293/102, 120, 293/122, 132, 133, 142, 143, 145, 155

(56) References Cited

U.S. PATENT DOCUMENTS

| | | | | |
|---|---|---|---|---|
| 2,762,646 A | * | 9/1956 | Dollar ......................... | 293/143 |
| 2,954,255 A | * | 9/1960 | Bates .......................... | 293/145 |
| 3,842,565 A | * | 10/1974 | Brown et al. ................ | 293/143 |
| 5,114,198 A | * | 5/1992 | Yamashita et al. ........... | 293/120 |
| 5,425,561 A | * | 6/1995 | Morgan ....................... | 293/120 |
| 5,584,518 A | * | 12/1996 | Frank et al. ................ | 293/102 |
| 6,042,163 A | * | 3/2000 | Reiffer ....................... | 293/102 |
| 6,179,353 B1 | * | 1/2001 | Heatherington et al. .... | 293/122 |
| 6,579,189 B2 | * | 6/2003 | Anzaldua ..................... | 473/139 |

* cited by examiner

Primary Examiner—Lori L. Coletta
(74) Attorney, Agent, or Firm—The Webb Law Firm

(57) ABSTRACT

The present invention provides a golf car bumper assembly which is mounted on a front axle of a golf car in order to reduce extensive damage to the body of the golf car in the event of a collision, comprising a bumper beam having a first end and a second end, a front surface and a back surface, and extending in a longitudinal direction, a pair of bumper guards, each having depending ends, a pair of mounting plates, a pair of bumper brackets, and at least two fasteners. Also provided is a kit comprised of the separate components of the bumper assembly and a method for attaching the bumper assembly components on the front axle of a golf car.

15 Claims, 3 Drawing Sheets

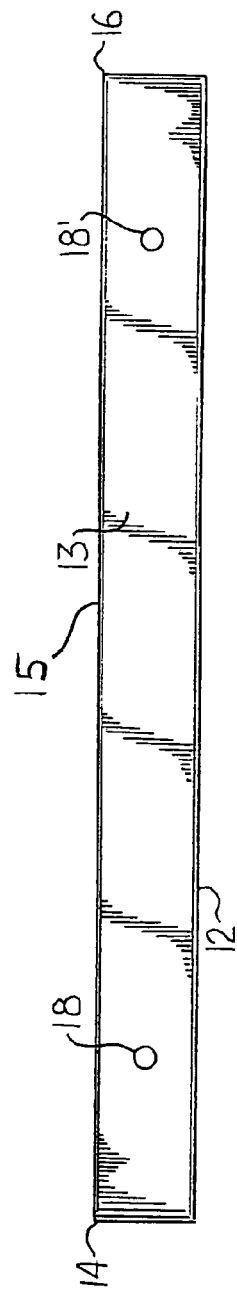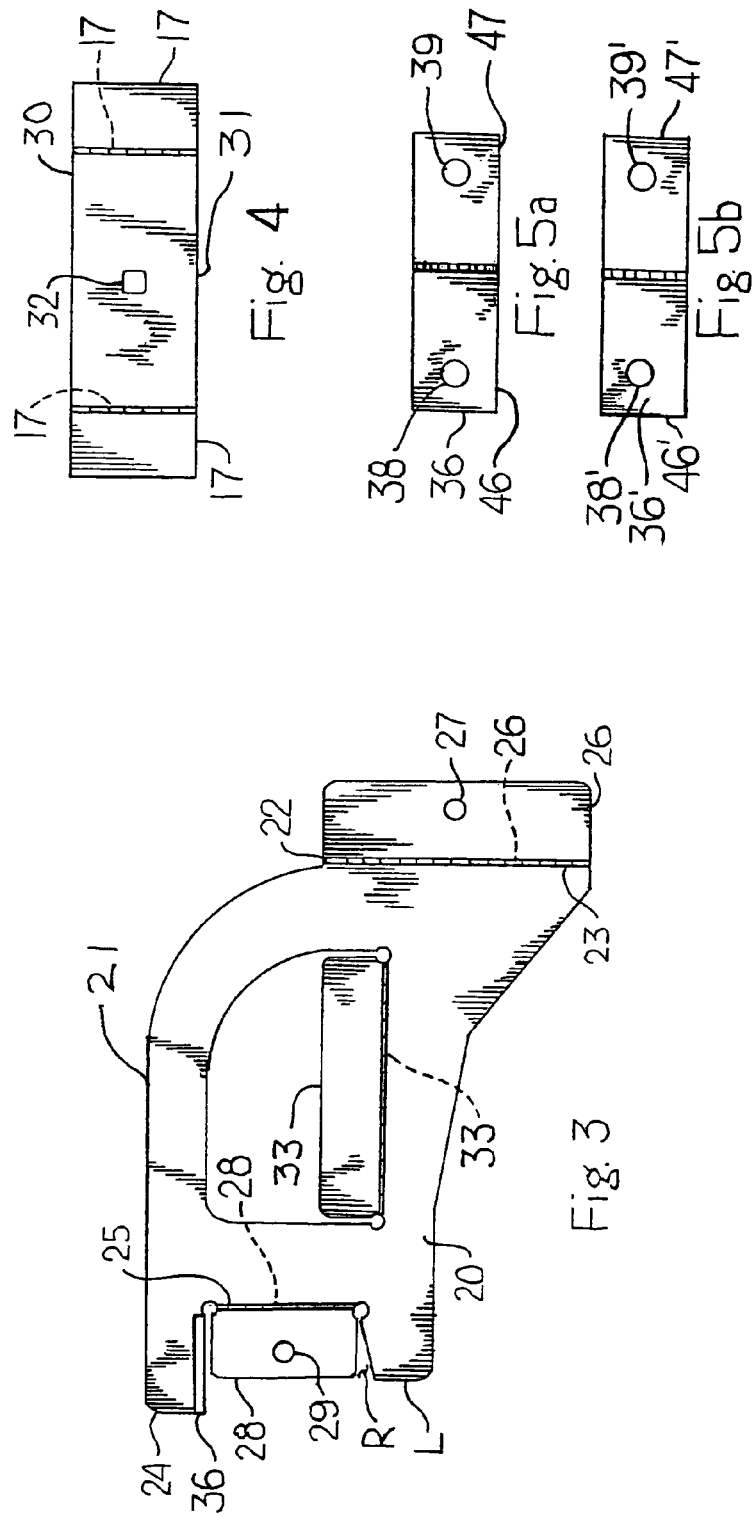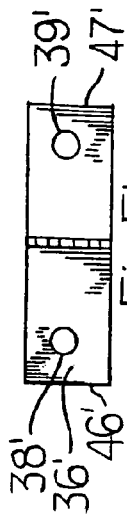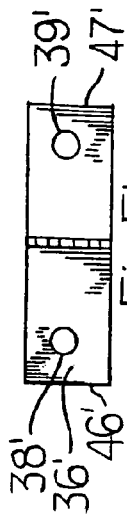

GOLF CAR BUMPER

CROSS REFERENCE TO RELATED APPLICATION(S)

The present invention claims priority to U.S. Provisional Application No. 60/423,842, filed Nov. 5, 2002, which is hereby incorporated by reference.

BACKGROUND OF THE INVENTION

1. Field of the Invention

The present invention relates generally to bumpers for a vehicle and, more particularly, to a bumper for a golf car.

2. Description of Related Art

A typical golf car can have a conventional vehicle bumper attached to the front and/or rear portion of a golf car. However, these conventional vehicle bumpers do not protrude outwardly enough or have sufficient strength to withstand a collision against an external vehicle or object to prevent damage to the golf car.

Typically, golf cars are very susceptible to damage by external forces such as from colliding into other golf cars, trees, or people. Often times, these golf cars exhibit visible damage to the body from a collision within a year of continuous use. It would be desirable to have a robust frame-mounted bumper assembly mounted to the front axle of the golf car which would protrude far enough to prevent damage to the body of the golf car resulting from a collision, thereby reducing the cost of repair. Therefore, it is an object of the present invention to overcome the above-mentioned deficiencies by reducing the damage and/or cost of repair to the body of a golf car resulting from a collision.

SUMMARY OF THE INVENTION

The present invention provides a bumper assembly for a golf car that can be attached to a front axle of a golf car to protect the golf car from damage during a collision. Also provided is a method for affixing the bumper assembly on to the front axle of the golf car. Further, the present invention provides a bumper assembly kit comprised of the separate components of the bumper assembly. The bumper assembly includes a bumper beam having a front surface and back surface, a first end and a second end, a hole adjacent the first end and a hole adjacent the second end. The bumper assembly also includes a pair of bumper guards, each having a hole defined therein and depending ends that are bent to define a bumper beam recess which receives the front surface of the bumper beam. A pair of bumper brackets is provided, each bracket having a body, a first end, a second end, a first lip at the first end depending from the body and a hole defined therein, a second lip at the second end depending from the body and a hole defined therein, and a third lip depending from the body. The bumper assembly further includes at least two fasteners and a pair of metal mounting plates positioned between the second end of the bumper brackets and the front axle of the golf car to secure the brackets to the front axle of the golf car. The bumper brackets are affixed to the back surface of the bumper beam by aligning the hole of the first lip of the first bracket with the hole adjacent the first end of the bumper beam, and aligning the hole of the first lip of the second bracket with the hole adjacent the second end of the bumper beam. Each of the aligned holes receives one of the fasteners to secure the bumper beam to the bumper brackets. The bumper guards are affixed to the front surface of the bumper beam by aligning the hole of the first bumper guard with the hole adjacent the first end of the bumper beam, and aligning the hole of the second bumper guard with the hole adjacent the second end of the bumper beam. Each of the aligned holes receives one of the fasteners to further secure the bumper beam to the bumper brackets. Each of the mounting plates has a first end and a second end, with each of the ends having a hole defined therein. The hole of the first end of the first mounting plate is aligned with the hole of the second end of the first bracket, and the hole of the second end of the first mounting plate is aligned to a first hole defined in the front axle of the golf car, and a hole of the first end of the second mounting plate is aligned with the hole of the second end of the second bracket, and a hole of the second end of the second mounting plate is aligned to a second hole defined in the front axle of the golf car. Each of the aligned holes receives one of the fasteners to secure the mounting plates to the brackets and to secure the mounting plates to the front axle of the golf car.

BRIEF DESCRIPTION OF THE DRAWINGS

FIG. 2 is a top plan view of a bumper beam of the bumper assembly shown in FIG. 1;

FIG. 3 is a side elevational view of a vertical bumper bracket of the bumper assembly shown in FIG. 1;

FIG. 4 is a top plan view of a bumper guard of the bumper assembly shown in FIG. 1;

FIG. 5A is a top plan view of a mounting plate taken along line VA—VA in FIG. 1;

FIG. 5B is a top plan view of a mounting plate taken along line VB—VB in FIG. 1;

DETAILED DESCRIPTION OF THE PREFERRED EMBODIMENT

The present invention provides a bumper assembly for a golf car. The present invention also provides a bumper assembly kit comprised of the separate components of the bumper assembly. Further, a method is provided for attaching the bumper assembly on a golf car.

Figure 1:
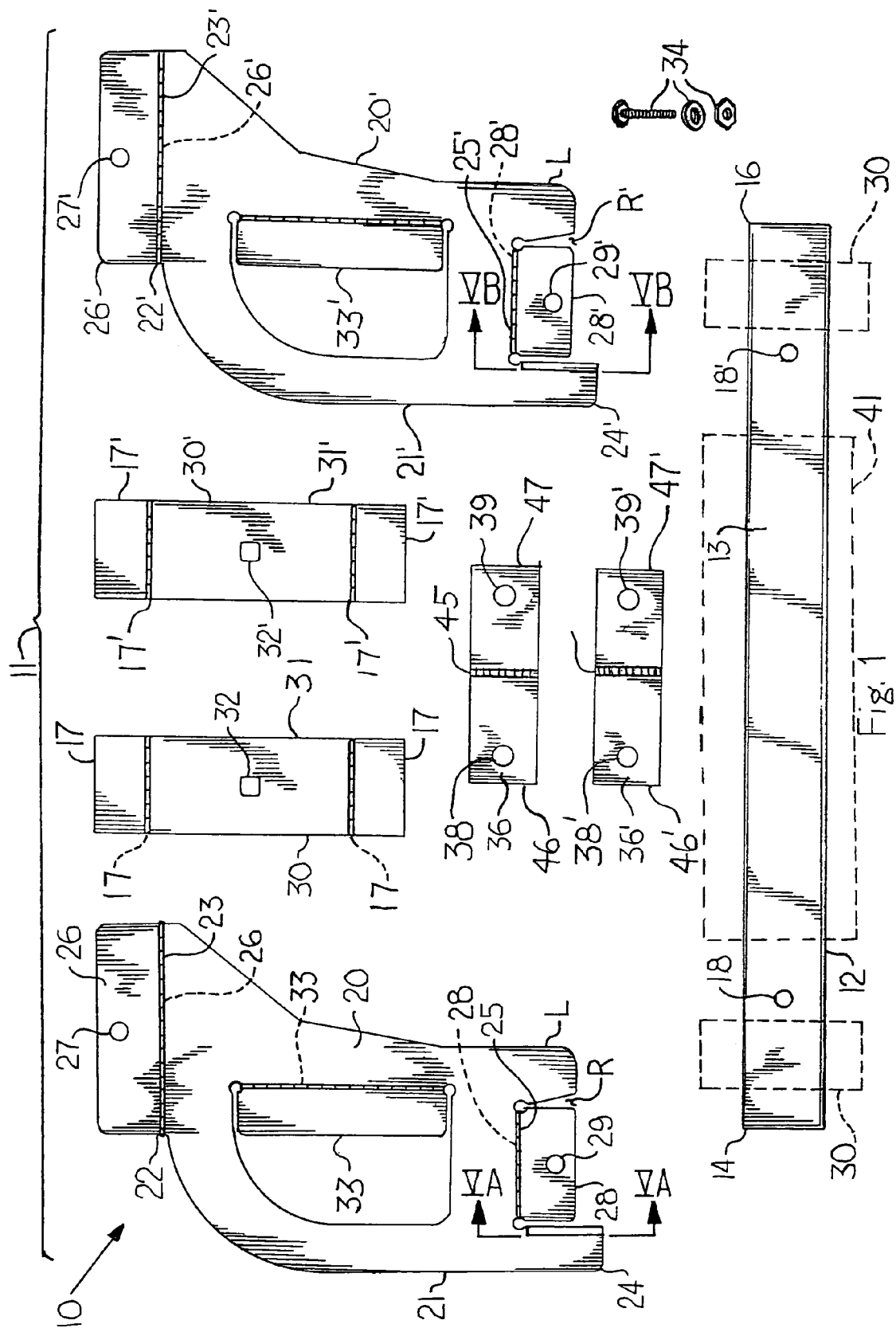
FIG. 1 is a plan view of a disassembled bumper assembly made in accordance with the present invention.
Figure 6:
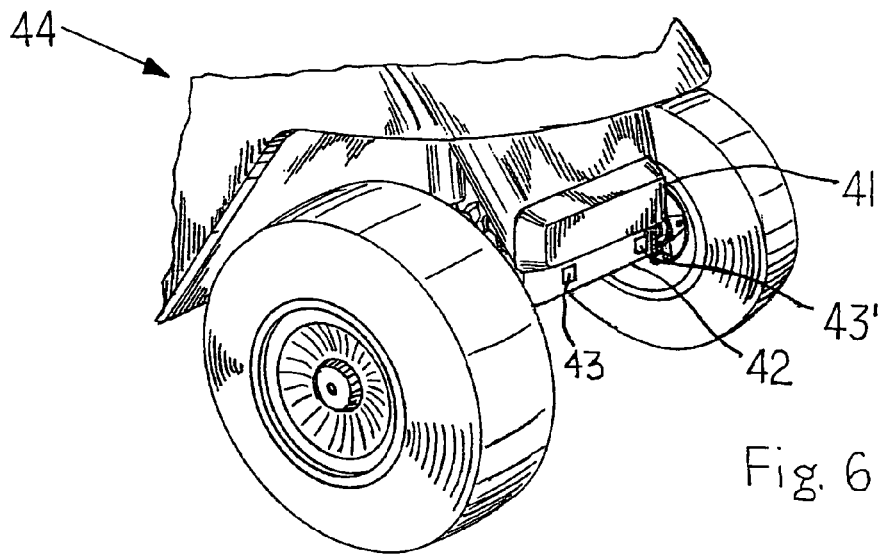
FIG. 6 is a top perspective view of a front portion of a typical golf car.

FIGS. 1–5B show a bumper assembly 10 disassembled into its separate components, which includes a bumper beam 12, a pair of brackets 20, 20', a pair of bumper guards 30, 30' a pair of mounting plates 36, 36', and at least two fasteners 34. Referring to FIGS. 1–2 and 6, the bumper beam 12, having a front surface 13 and a back surface 15 and a first end 14 and a second end 16, includes a rectangular hollow cross section and stands in a longitudinal direction, substantially to the full width of the golf car 44. A pair of holes 18, 18' is defined adjacent the first end 14 and the second end 16 of the bumper beam 12, respectively. The holes 18, 18' are adapted to receive one of the fasteners 34 for securing the bumper beam 12 to the bumper brackets 20, 20'. The bumper beam 12 can be made of metal such as a 16-gauge steel tube or a rigid polymeric material. The front surface 13 of the bumper beam 12 also can be covered with an elastomeric material, such as polyurethane, rubber, or foam material.

Referring to FIGS. 1, 3, 7–8, the bumper brackets 20, 20', having a body 21, 21', a first end 22, 22', a second end 24, 24', a first lip 26, 26' positioned at the first end 22, 22' and depending from the body 21, 21', a second lip 28, 28' positioned at the second end 24, 24' and depending from the body 21, 21', and a third lip 33, 33' depending from the body 21, 21', are used to attach the bumper beam 12 to a front axle 42 of the golf car 44. The first lip 26 of the bumper bracket 20 is bent as shown in phantom 23, 23' and has a hole 27 defined therein. The second lip 28 is bent as shown in phantom 25 and also has a hole 29 defined therein. The first bumper bracket 20 is affixed to the back surface 15 of the bumper beam 12 by aligning the hole 27 of the first lip 26 with the hole 18 adjacent the first end 14 of the bumper beam 12, and aligning the hole 27' of the first lip 26' of the second bumper bracket 20' with the hole 18' adjacent the second end 16 of the bumper beam 12. A fastener 34 is passed through each of the aligned holes 27 and 18, and 27' and 18', i.e., each of the aligned holes 27 and 18, and 27' and 18' receives a fastener 34 therein to secure the bumper beam 12 to the bumper brackets 20, 20'.

Figure 7:
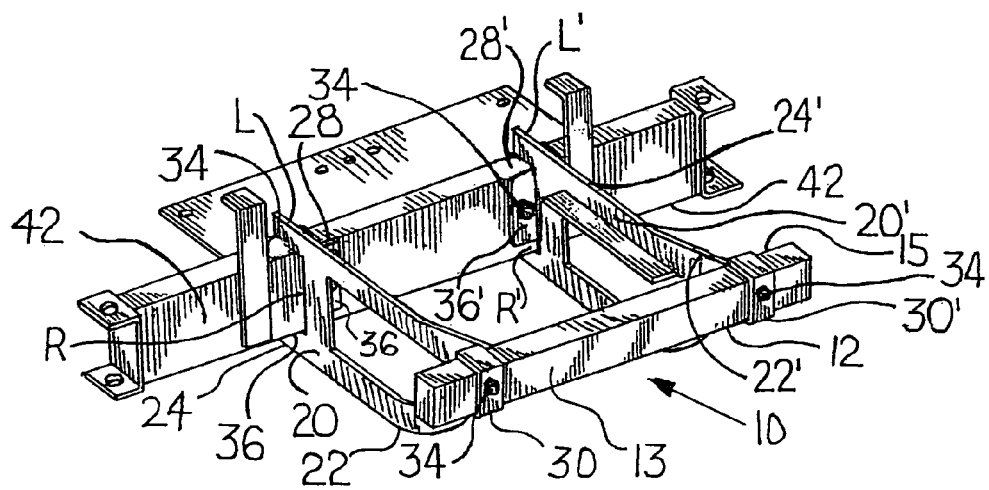
FIG. 7 is a top perspective view of a bumper assembly attached to a front axle of a golf car made in accordance with the present invention.
Figure 8:
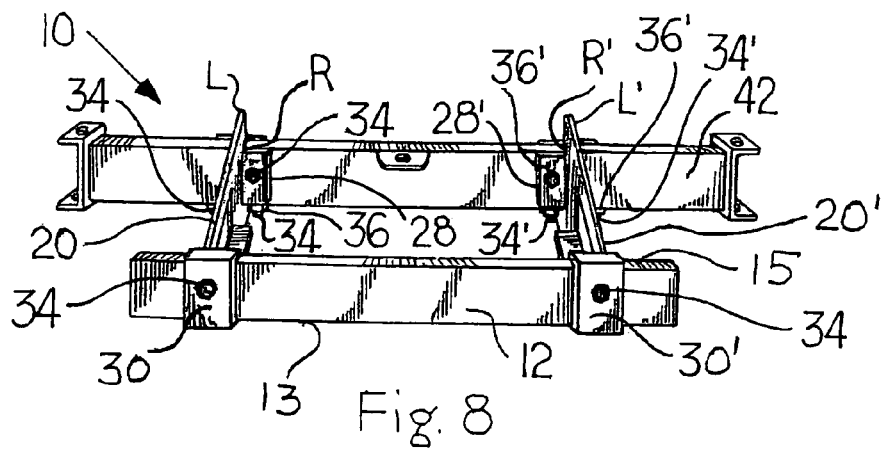
FIG. 8 is a top perspective view of the bumper assembly attached to the front axle of a golf car shown in FIG. 7.

Referring to FIGS. 1, 4, 7–8, the pair of bumper guards 30, 30' having depending ends that are bent as shown in phantom 17, 17' to define a bumper beam recess 31, 31', receive the front surface 13 of the bumper beam 12 in the bumper beam recess 31, as shown in FIGS. 7–8. FIGS. 1 and 4 also show the ends 17, 17' in the unbent state. The bumper guards 30, 30' are affixed to the front surface 13 of the bumper beam 12 by aligning a square hole 32 of the first bumper guard 30 with the hole 18 adjacent the first end 14 of the bumper beam 12, and aligning the square hole 32' of the second bumper guard 30' with the hole 18' adjacent the second end 16 of the bumper beam 12. Respective fasteners 34 are passed through each of the aligned holes 32, 27 and 18, and 32', 27' and 18', i.e., each of the aligned holes 32, 27 and 18, and 32', 27' and 18' receives the fastener 34 therein, to further secure the bumper beam 12 to the bumper brackets 20, 20'. Preferably, these fasteners 34 have a square cross-section shank portion that mates with the square holes 32, 32'.

Referring to FIGS. 1 and 5–8, the brackets 20, 20' include a pair of bottom mounting plates 36, 36', respectively, to secure the second end 24, 24' of the brackets 20, 20', respectively, to the front axle 42 of the golf car 44. The mounting plates 36, 36' are welded to the brackets 20, 20'. Each mounting plate 36, 36' has a first end 46, 46' and a second end 47, 47', said first end 46, 46' having a hole 38, 38' defined therein and said second end 47, 47' having a hole 39, 39' defined therein. The hole 38 of the first end 46 of the first mounting plate 36 is aligned with the hole 29 defined in the second end 24 of the first bumper bracket 20, and the hole 38' of the first end 46' of the second mounting plate 36' is aligned with the hole 29' defined in the second end 24' of the second bumper bracket 20'. A fastener 34 is passed through each of the aligned holes 38 and 29, and 38' and 29', respectively, i.e., each of the aligned holes 38 and 29, and 38' and 29' receives a fastener 34 therein to secure the bumper brackets 20, 20' to the mounting plates 36, 36'. The holes 39, 39' of the second ends 47, 47' of the mounting plates 36, 36' are aligned with holes 43, 43' defined in the front axle 42 of the golf car 44 to affix the mounting plates 36, 36' to the front axle 42 of the golf car 44.

The bumper assembly 10 can also include an impact-absorbing member 41 attached to the bumper beam 12, the bumper brackets 20, 20', and/or the bumper guards 30, 30', to absorb the impact during a collision. The absorbing member 41 can be made of an elastomeric material, such as foam, rubber, or the like. The body 21, 21' defines a bumper receiving recess R, R' defined by lips L, L' and the bent second lips 25 and 25' mounting plates 36 and 36'.

The present invention can be sold as a kit 11, as shown in FIG. 1. Alternatively, the bumper assembly 10 can be sold as a unit for attachment to the front axle 42 of a golf car 44. Finally, a golf car 44 can be manufactured with a bumper assembly 10 attached thereto. Preferably, eight fasteners 34 are provided with the kit 11, where one fastener 34 passes through holes 18, 32 and 29, and one fastener 34 passes through holes 18', 32' and 29'. Further, three fasteners 34 pass through holes 27, 38 and 39 into the front axle 42, respectively, and three fasteners 34 pass through holes 27', 38' and 39' in the front axle 42, respectively.

Referring to FIGS. 1, 6–8, in operation, the bumper assembly 10 can be mounted to a front axle 42 of a golf car 44 for protecting the golf car 44 from damage resulting from a collision. If the bumper assembly 10 becomes damaged, the bumper assembly 10 can be simply unfastened from the front axle 42 of the golf car 44 and repaired. Replacing the bumper assembly 10 is less expensive than replacing or repairing damage to the body of the golf car 44. Also, the golf car 44 does not have to be taken out of service for an extended period of time in order to replace and/or repair the bumper assembly 10.

FIG. 6 illustrates a front portion of a typical golf car 44 without a bumper. Referring to FIGS. 6–8, a bumper assembly 10 is provided for attachment to the front axle 42 of the golf car 44 to protect the body of the golf car 44 from damage during a collision. The bumper assembly 10 can be mounted to the front axle 42 of the golf car 44, and extends in a longitudinal direction along the width of the frame of the golf car 44. The bumper assembly 10, which protrudes outwardly away from the front portion of the golf car 44 and thus provides a gap between the front axle 42 of the golf car 44 and the bumper assembly 10, can protect the golf car's 44 front body panel covers, right and left spindles, tie rods, adjusting tubes, steering column, and front axle 42 during a collision. The rear bumper, rear fenders, and bag compartment are less likely to become damaged during a collision.

The present invention has been described with reference to specific details of particular embodiments thereof. It is not intended that such details be regarded as limitations upon the scope of the invention except insofar as and to the extent that they are included in the accompanying claims.

What is claimed is:

1. A bumper assembly for a golf car, comprising:
a bumper beam having a first end and a second end, a front surface and a back surface, said bumper beam extending in a longitudinal direction; and
a first bumper bracket and a second bumper bracket, each bumper bracket having a first end and a second end, wherein said first end of said first bumper bracket is affixed to said first end of said back surface of said bumper beam, a first bumper guard is affixed to said front surface of said front end of said bumper beam, said first end of said second bumper bracket is affixed to said second end of said back surface of said bumper beam, a second bumper guard is affixed to said front surface of said second end of said bumper beam, said second end of said first bumper bracket and said second end of said second bumper bracket are adapted to be affixed to a front axle of the golf car, wherein each bumper bracket has a body, a first lip positioned at said first end of said bumper bracket and depending from said body, a second lip positioned at said second end of said bumper bracket and depending from said body, and a third lip depending from said body, wherein said first lip and said second lip each have a hole defined therein.

2. The bumper assembly of claim 1, further comprising said bumper beam having a hole defined adjacent to said first end and a hole defined adjacent to said second end, and at least two fasteners, wherein said bumper brackets are affixed to said back surface of said bumper beam by aligning the hole of said first lip of said first bumper bracket with the hole adjacent to said first end of said bumper beam, and aligning the hole of said first lip of said second bumper bracket with the hole adjacent to said second end of said bumper beam, wherein each of the aligned holes receives one of said fasteners therein to secure said bumper beam to said bumper brackets.

3. A bumper assembly for a golf car, comprising:
   a bumper beam having a first end and a second end, a front surface and a back surface, said bumper beam extending in a longitudinal direction; and
   a first bumper bracket and a second bumper bracket, each bumper bracket having a first end and a second end, wherein said first end of said first bumper bracket is affixed to said first end of said back surface of said bumper beam, a first bumper guard is affixed to said front surface of said front end of said bumper beam, said first end of said second bumper bracket is affixed to said second end of said back surface of said bumper beam, a second bumper guard is affixed to said front surface of said second end of said bumper beam, said second end of said first bumper bracket and said second end of said second bumper bracket are adapted to be affixed to a front axle of the golf car, further comprising the first bumper guard and the second bumper guard, each of said bumper guards having depending ends.

4. The bumper assembly of claim 3, further comprising at least two fasteners, wherein each bumper guard has a hole defined therein and depending ends defining a bumper beam recess, wherein said front surface of said bumper beam is received in said bumper beam recess of said bumper guards, and wherein said bumper guards are affixed to said front surface of said bumper beam by aligning the hole of said first bumper guard with the hole adjacent to said first end of said bumper beam, and aligning the hole of said second bumper guard with the hole adjacent to said second end of said bumper beam, wherein each of the holes receives one of said fasteners therein to further secure said bumper beam to said bumper brackets.

5. The bumper assembly of claim 1, wherein said front surface of said bumper beam is covered with an elastomeric material.

6. The bumper assembly of claim 3, wherein said bumper guards are covered with an elastomeric material.

7. A bumper assembly for a golf car, said bumper assembly comprising:
   a bumper beam having a first end and a second end, a front surface and a back surface, a hole defined adjacent said first end and a hole defined adjacent said second end, said bumper beam extending in a longitudinal direction;
   a first bumper guard and a second bumper guard, each bumper guard having a hole defined therein and depending ends defining a bumper beam receiving recess;
   a first bumper bracket and a second bumper bracket, each bumper bracket having a first end and a second end, said bumper bracket having a body, a first lip positioned at said first end of said bumper bracket and depending from said body, a second lip positioned at said second end of said bumper bracket and depending from said body, a third lip depending from said body, said first lip and said second lip each having a hole defined therein; and
   at least two fasteners, wherein said bumper brackets are affixed to said back surface of said bumper beam by aligning the hole of said first lip of said first bumper bracket with the hole adjacent to said first end of said bumper beam, and aligning the hole of said first lip of said second bumper bracket with the hole adjacent to said second end of said bumper beam, wherein each of the holes receives one of said fasteners therein to secure said bumper beam to said bumper brackets, and wherein said depending ends of said bumper guards receive said front surface of said bumper beam in said bumper beam recess and said bumper guards are affixed to said front surface of said bumper beam by aligning the hole of said first bumper guard with the hole adjacent to said first end of said bumper beam, and aligning the hole of said second bumper guard with the hole adjacent to said second end of said bumper beam, and wherein each of the holes receives one of said fasteners therein to further secure said bumper beam to said bumper brackets, and wherein said first bumper bracket and said second bumper bracket are adapted to affix to a front axle of a golf car.

8. A method for attaching a bumper assembly on a golf car, comprising:
   providing a bumper beam having a first end and a second end, a front surface and a back surface, said bumper beam extending in a longitudinal direction, wherein said bumper beam has a hole defined adjacent said first end and a hole defined adjacent said second end;
   providing a first bumper bracket and a second bumper bracket, each bumper bracket having a first end and a second end;
   affixing said first end of said first bumper bracket to said first end of said back surface of said bumper beam;
   affixing said first end of said second bumper bracket to said second end of said back surface of said bumper beam, wherein said first bumper bracket and said second bumper bracket are adapted to affix to a front axle of the golf car; and
   providing a first bumper guard and a second bumper guard, each of said bumper guards having depending ends, wherein each bumper guard has a hole defined therein.

9. A method for attaching a bumper assembly on a golf car, comprising:
   providing a bumper beam having a first end and a second end, a front surface and a back surface, said bumper beam extending in a longitudinal direction, wherein said bumper beam has a hole defined adjacent said first end and a hole defined adjacent said second end;
   providing a first bumper bracket and a second bumper bracket, each bumper bracket having a first end and a second end;
   affixing said first end of said first bumper bracket to said first end of said back surface of said bumper beam;
   affixing said first end of said second bumper bracket to said second end of said back surface of said bumper beam, wherein said first bumper bracket and said second bumper bracket are adapted to affix to a front axle of the golf car;
   providing a first bumper guard and a second bumper guard, each of said bumper guards having depending ends; and bending depending ends of each bumper guard to define a bumper beam recess, wherein said bumper beam is received in said bumper beam recess prior to affixing said bumper guards to said bumper beam.

10. A method for attaching a bumper assembly on a golf car, comprising:
providing a bumper beam having a first end and a second end, a front surface and a back surface, said bumper beam extending in a longitudinal direction, wherein said bumper beam has a hole defined adjacent said first end and a hole defined adjacent said second end;
providing a first bumper bracket and a second bumper bracket, each bumper bracket having a first end and a second end;
affixing said first end of said first bumper bracket to said first end of said back surface of said bumper beam;
affixing said first end of said second bumper bracket to said second end of said back surface of said bumper beam, wherein said first bumper bracket and said second bumper bracket are adapted to affix to a front axle of the golf car; and
providing a first bumper guard and a second bumper guard, each of said bumper guards having depending ends, wherein each bumper bracket has a body, a first lip positioned at said first end of said bumper bracket and depending from said body, a second lip positioned at said second end of said bumper bracket and depending from said body, and a third lip depending from said body, wherein said first lip and said second lip each have a hole defined therein.

11. A method for attaching a bumper assembly on a golf car, comprising:
providing a bumper beam having a first end and a second end, a front surface and a back surface, said bumper beam extending in a longitudinal direction, wherein said bumper beam has a hole defined adjacent said first end and a hole defined adjacent said second end;
providing a first bumper bracket and a second bumper bracket, each bumper bracket having a first end and a second end;
affixing said first end of said first bumper bracket to said first end of said back surface of said bumper beam;
affixing said first end of said second bumper bracket to said second end of said back surface of said bumper beam, wherein said first bumper bracket and said second bumper bracket are adapted to affix to a front axle of the golf car;
providing a first bumper guard and a second bumper guard, each of said bumper guards having depending ends;
providing at least two fasteners;
affixing said bumper brackets to said back surface of said bumper beam by aligning a hole of a first lip of said first bumper bracket with a hole adjacent to said first end of said bumper beam, and aligning a hole of said first lip of said second bumper bracket with a hole adjacent to said second end of said bumper beam, and passing one of said fasteners through each of the aligned holes to secure said bumper beam to said bumper brackets; and
receiving said bumper beam in a bumper beam recess and affixing bumper guards to said front surface of said bumper beam by aligning a hole of said first bumper guard with a hole adjacent to said first end of said bumper beam and aligning a hole of said second bumper guard with a hole adjacent to said second end of said bumper beam, and passing one of said fasteners through each of the aligned holes to further secure said bumper beam to said bumper brackets.

12. A method for placing a bumper assembly on a golf car, comprising:
providing a bumper beam having a first end and a second end, a front surface and a back surface, a hole defined adjacent said first end, and a hole defined adjacent said second end, said bumper beam extending in a longitudinal direction;
providing a first bumper guard and a second bumper guard, each bumper guard having a hole defined therein and depending ends, said depending ends defining a bumper beam receiving recess;
providing a first bumper bracket and a second bumper bracket, each bumper bracket having a body and a first end and a second end, a first lip positioned at said first end of said bumper bracket and depending from said body, a second lip positioned at said second end of said bumper bracket and depending from said body, and a third lip depending from said body, wherein said first lip and said second lip each have a hole defined therein;
providing at least two fasteners;
affixing said bumper brackets to said back surface of said bumper beam by aligning a hole of said first lip of said first bumper bracket with a hole adjacent to said first end of said bumper beam, and aligning a hole of said first lip of said second bumper bracket with a hole adjacent to said second end of said bumper beam, and passing one of said fasteners through each of the aligned holes to secure said bumper beam to said bumper brackets;
receiving said bumper beam in a bumper beam recess and affixing said bumper guards to said front surface of said bumper beam by aligning a hole of said first bumper guard with a hole adjacent to said first end of said bumper beam and aligning a hole of said second bumper guard with a hole adjacent to said second end of said front surface of said bumper beam, and passing one of said fasteners through each of the aligned holes to further secure said bumper beam to said bumper brackets; and
affixing said bumper brackets to a front axle of the golf car.

13. A kit for a bumper assembly for a golf car, comprising:
a bumper beam having a first end and a second end, and a front surface and a back surface;
a first bumper bracket and a second bumper bracket, each bumper bracket having a first end and a second end;
a first mounting plate and a second mounting plate; and
a first bumper guard and a second bumper guard, each bumper guard having depending ends, wherein said first bumper guard is adapted to receive said first end of said front surface of said bumper beam, said second bumper guard is adapted to receive said second end of said front surface of said bumper beam, said back surface of said first end of said bumper beam is adapted to receive said first end of said first bumper bracket, said back surface of said second end of said bumper beam is adapted to receive said first end of said second bumper bracket, and said first bumper bracket and said second bumper bracket are adapted to receive a front axle of the golf car.

14. In a golf car having a body, a plurality of wheels, and a front axle, the improvement comprising:
a bumper beam having a first end and a second end and a front surface and a back surface, said bumper beam extending in a width-wise direction of said golf car; and a first bumper bracket and a second bumper bracket, each bumper bracket having a first end and a second end, wherein said first bumper bracket is affixed to said first end of said back surface of said bumper beam, a first bumper guard is affixed to said front surface of said front end of said bumper beam, said second bumper bracket is affixed to said second end of said back surface of said bumper beam, a second bumper guard is affixed to said front surface of said second end of said bumper beam, said second end of said first bumper bracket is affixed to said front axle of said golf car, said second end of said second bumper bracket is affixed to said front axle of said golf car, wherein each bumper bracket has a body, a first lip positioned at said first end of said bumper bracket and depending from said body, a second lip positioned at said second end of said bumper bracket and depending from said body, and a third lip depending from said body, wherein said first lip and said second lip each have a hole defined therein.

15. In a golf car having a body, a plurality of wheels, and a front axle, the improvement comprising:

a bumper beam having a first end and a second end and a front surface and a back surface, said bumper beam extending in a width-wise direction of said golf car; and a first bumper bracket and a second bumper bracket, each bumper bracket having a first end and a second end, wherein said first bumper bracket is affixed to said first end of said back surface of said bumper beam, a first bumper guard is affixed to said front surface of said front end of said bumper beam, said second bumper bracket is affixed to said second end of said back surface of said bumper beam, a second bumper guard is affixed to said front surface of said second end of said bumper beam, said second end of said first bumper bracket is affixed to said front axle of said golf car, said second end of said second bumper bracket is affixed to said front axle of said golf car, further comprising the first bumper guard and the second bumper guard, each of said bumper guards having depending ends.

* * * * *